US012695030B2

(12) United States Patent
Lim et al.

(10) Patent No.: US 12,695,030 B2
(45) Date of Patent: Jul. 28, 2026

(54) CERAMIC CAPACITOR

(71) Applicant: AMOTECH CO., LTD., Incheon (KR)

(72) Inventors: Byungguk Lim, Incheon (KR); Yunsuk Choi, Incheon (KR); Jaeyong Song, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 103 days.

(21) Appl. No.: 18/711,583

(22) PCT Filed: Nov. 15, 2022

(86) PCT No.: PCT/KR2022/017927
§ 371 (c)(1),
(2) Date: May 18, 2024

(87) PCT Pub. No.: WO2023/090797
PCT Pub. Date: May 25, 2023

(65) Prior Publication Data
US 2025/0014822 A1     Jan. 9, 2025

(30) Foreign Application Priority Data

Nov. 18, 2021     (KR) ........................ 10-2021-0159047

(51) Int. Cl.
*H01G 4/12*      (2006.01)
*H01G 4/012*     (2006.01)
*H01G 4/228*     (2006.01)
*H01G 4/30*      (2006.01)

(52) U.S. Cl.
CPC .......... *H01G 4/1227* (2013.01); *H01G 4/012* (2013.01); *H01G 4/228* (2013.01); *H01G 4/30* (2013.01)

(58) Field of Classification Search
CPC ...... H01G 4/1227; H01G 4/012; H01G 4/228; H01G 4/30
See application file for complete search history.

(56) References Cited

U.S. PATENT DOCUMENTS 9,305,704 B2     4/2016  Park et al.
9,536,662 B2     1/2017  Kim et al.
9,633,790 B1     4/2017  Kim
(Continued)

FOREIGN PATENT DOCUMENTS

JP            6816817 B2     1/2021
KR     10-2015-0011165 A     1/2015
(Continued)

OTHER PUBLICATIONS

KR Office Action dated Apr. 12, 2024 as received in Application No. 10-2021-0159047.

*Primary Examiner* — Michael P Mcfadden
(74) *Attorney, Agent, or Firm* — Maschoff Brennan

(57) ABSTRACT

A ceramic capacitor of the present invention comprises: a ceramic body 100 in which a plurality of first dielectric layers 110 are stacked; and first and second bottom electrodes 211 and 212 arranged on both sides of the bottom surface of the ceramic body 100, wherein the plurality of first dielectric layers 110 are formed of only dielectric. The present invention has an advantage of providing a multilayer ceramic capacitor having a low capacity structure to have a high reaction speed while operating at a high frequency.

7 Claims, 16 Drawing Sheets

(56) References Cited

U.S. PATENT DOCUMENTS

| | | | | |
|---|---|---|---|---|
| 2004/0042156 A1* | 3/2004 | Devoe | .................... | H01G 4/228 |
| | | | | 361/321.2 |
| 2009/0040687 A1* | 2/2009 | Oakes | ..................... | H01G 5/00 |
| | | | | 361/313 |
| 2013/0083044 A1* | 4/2013 | Zuo | ..................... | H03H 9/2405 |
| | | | | 310/365 |
| 2013/0321981 A1* | 12/2013 | Ahn | ........................ | H01G 4/30 |
| | | | | 361/728 |
| 2015/0022946 A1 | 1/2015 | Park et al. | | |
| 2015/0068792 A1* | 3/2015 | Cho | ......................... | H01G 2/06 |
| | | | | 174/258 |
| 2015/0179339 A1 | 6/2015 | Seo et al. | | |
| 2016/0133384 A1* | 5/2016 | Park | ...................... | H01G 4/232 |
| | | | | 361/301.4 |
| 2018/0174757 A1* | 6/2018 | Kim | ...................... | H01G 4/248 |
| 2019/0157004 A1* | 5/2019 | Park | ...................... | H01G 4/232 |
| 2019/0385793 A1 | 12/2019 | Wakashima | | |
| 2020/0105467 A1* | 4/2020 | Jeong | ................... | H01G 4/2325 |

FOREIGN PATENT DOCUMENTS

| | | | |
|---|---|---|---|
| KR | 10-2015-0072804 A | 6/2015 | |
| KR | 10-1525666 B1 | 6/2015 | |
| KR | 10-1936779 B1 | 1/2019 | |
| KR | 10-2076150 B1 | 2/2020 | |

* cited by examiner

[FIG. 1A]
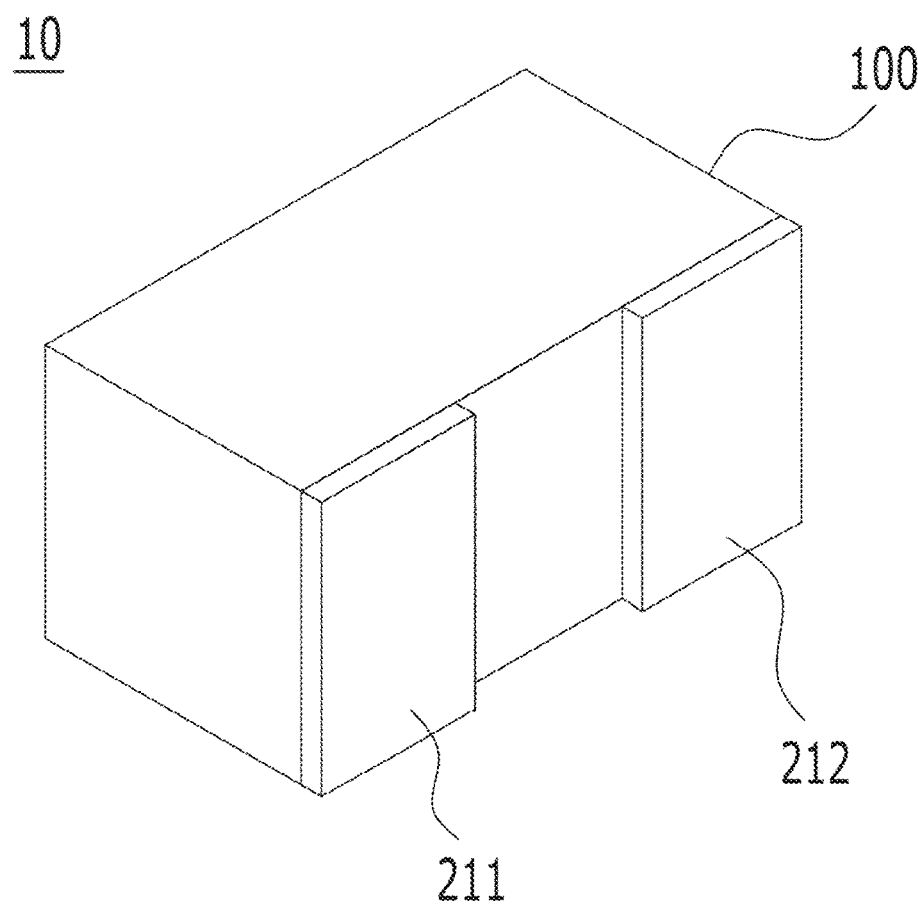

[FIG. 1B]
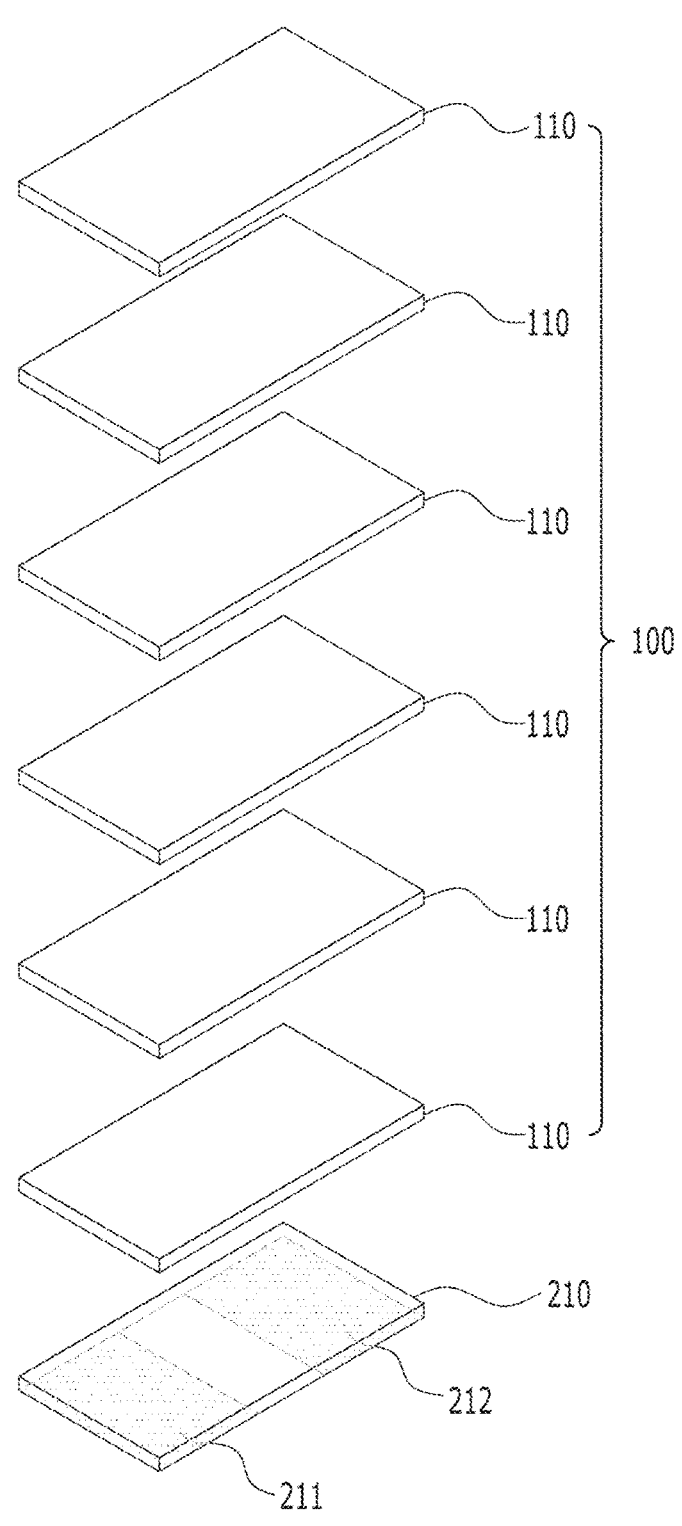

[FIG. 1C]
<u>10</u>
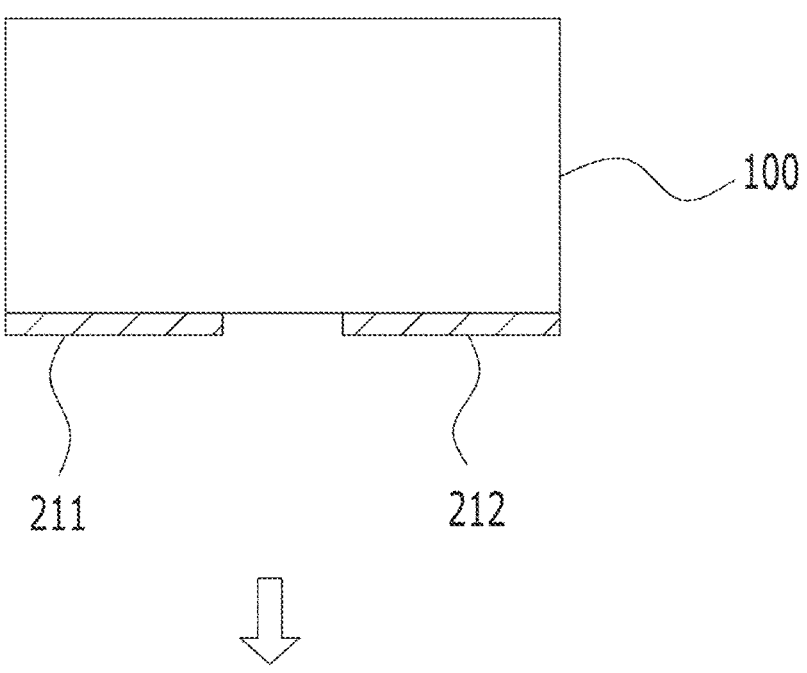
<u>10</u>
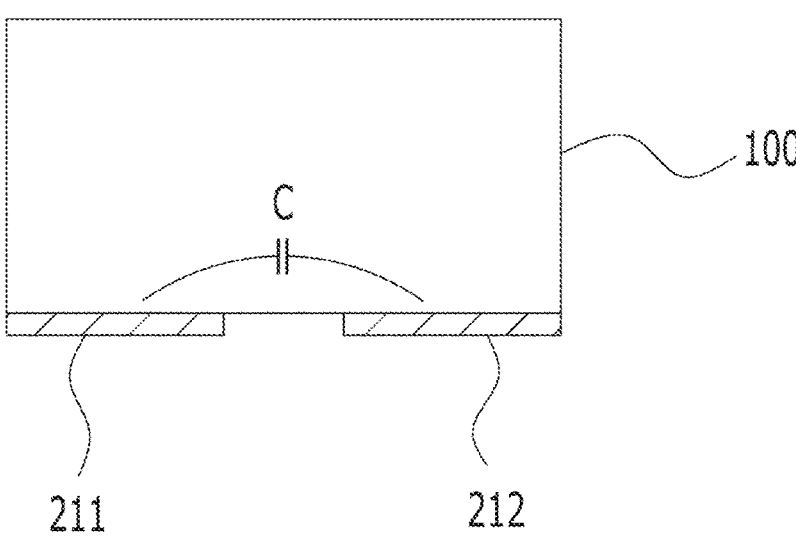

[FIG. 2A]
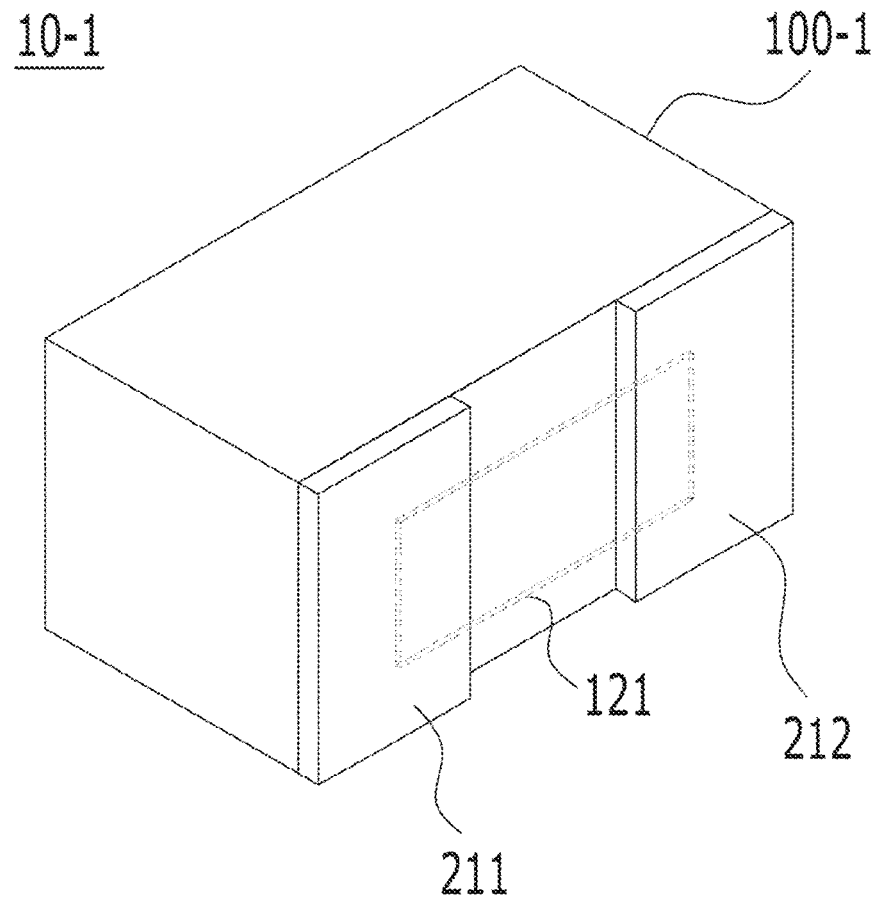

[FIG. 2B]
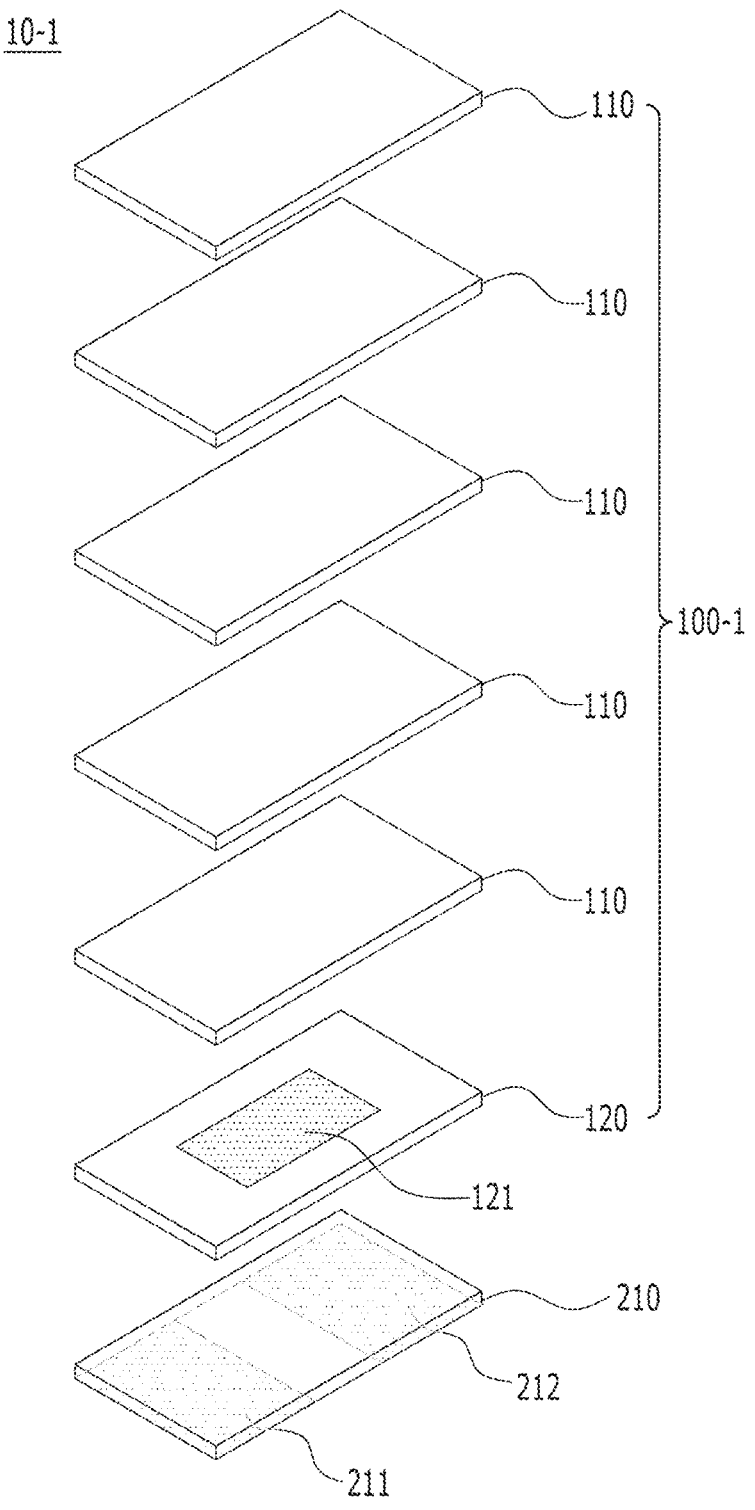

[FIG. 2C]
10-1
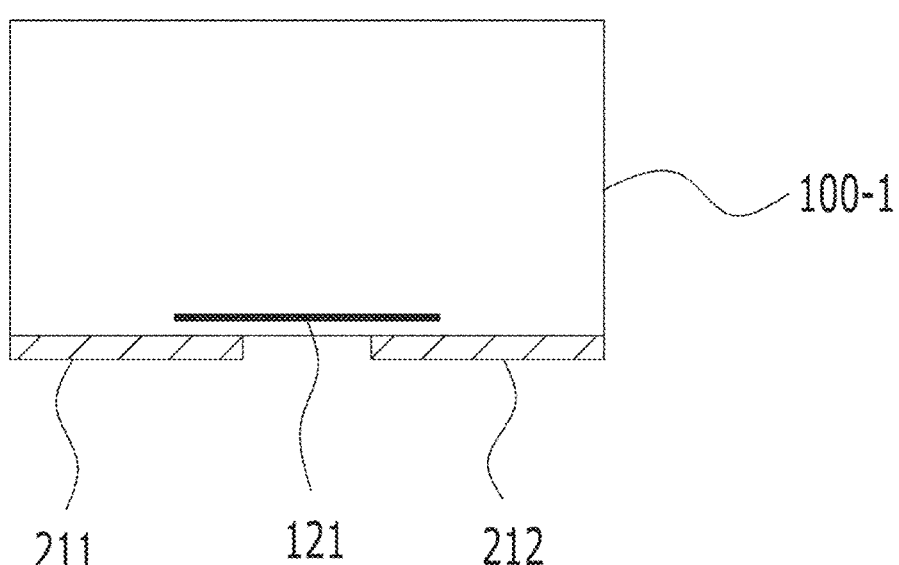
100-1
211     121     212

[FIG. 3A]
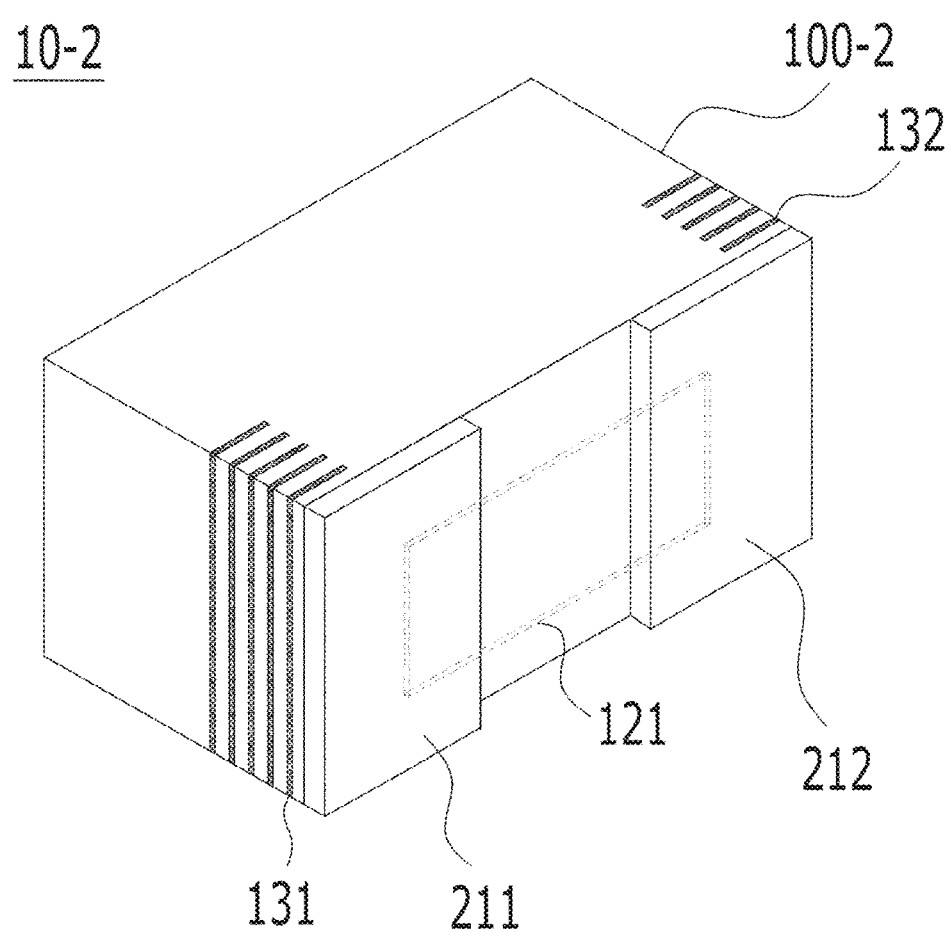

[FIG. 3B]
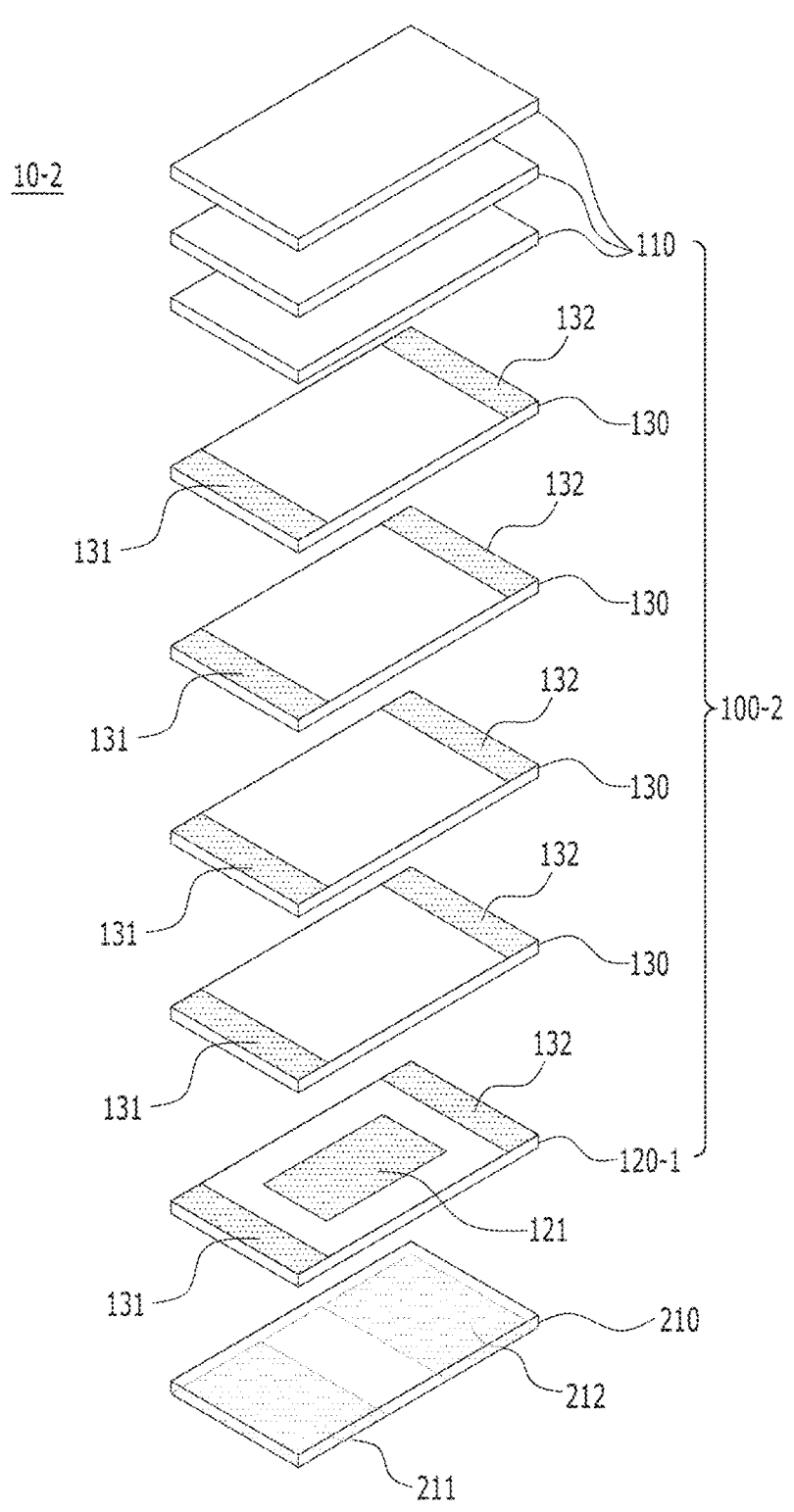

[FIG. 3C]
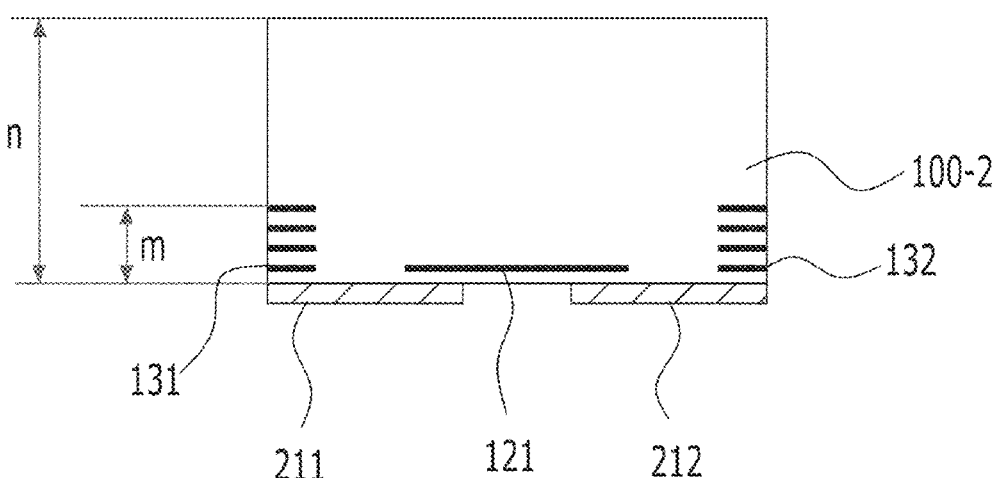
[FIG. 3D]
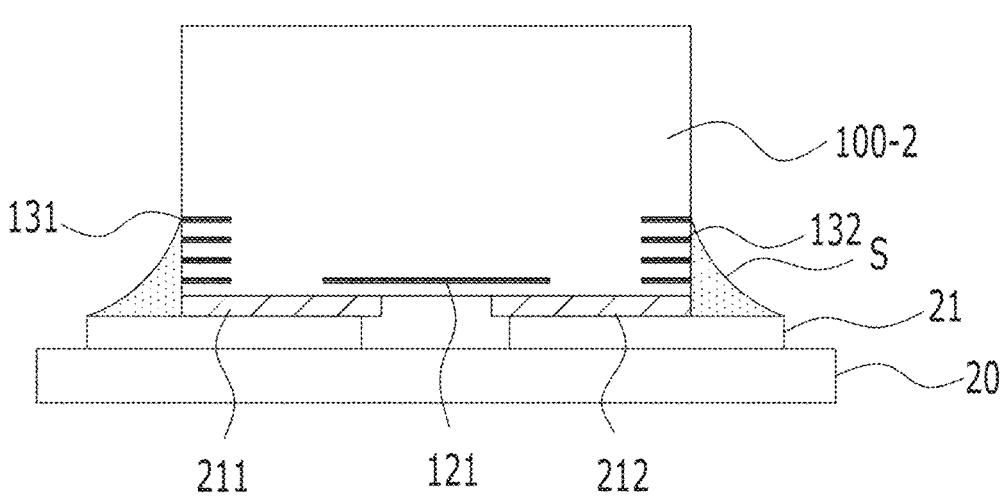

[FIG. 3E]
<u>10-2</u>
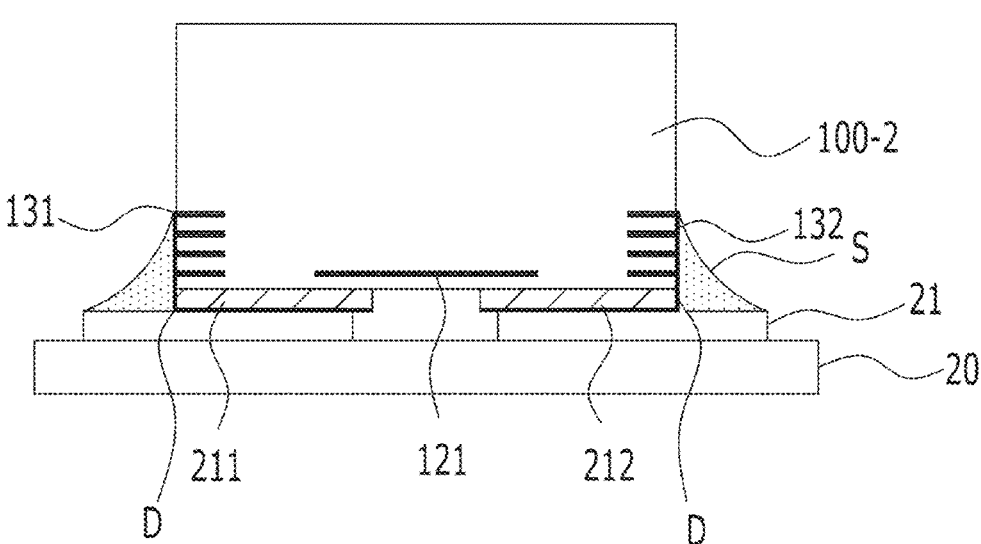

[FIG. 4A]
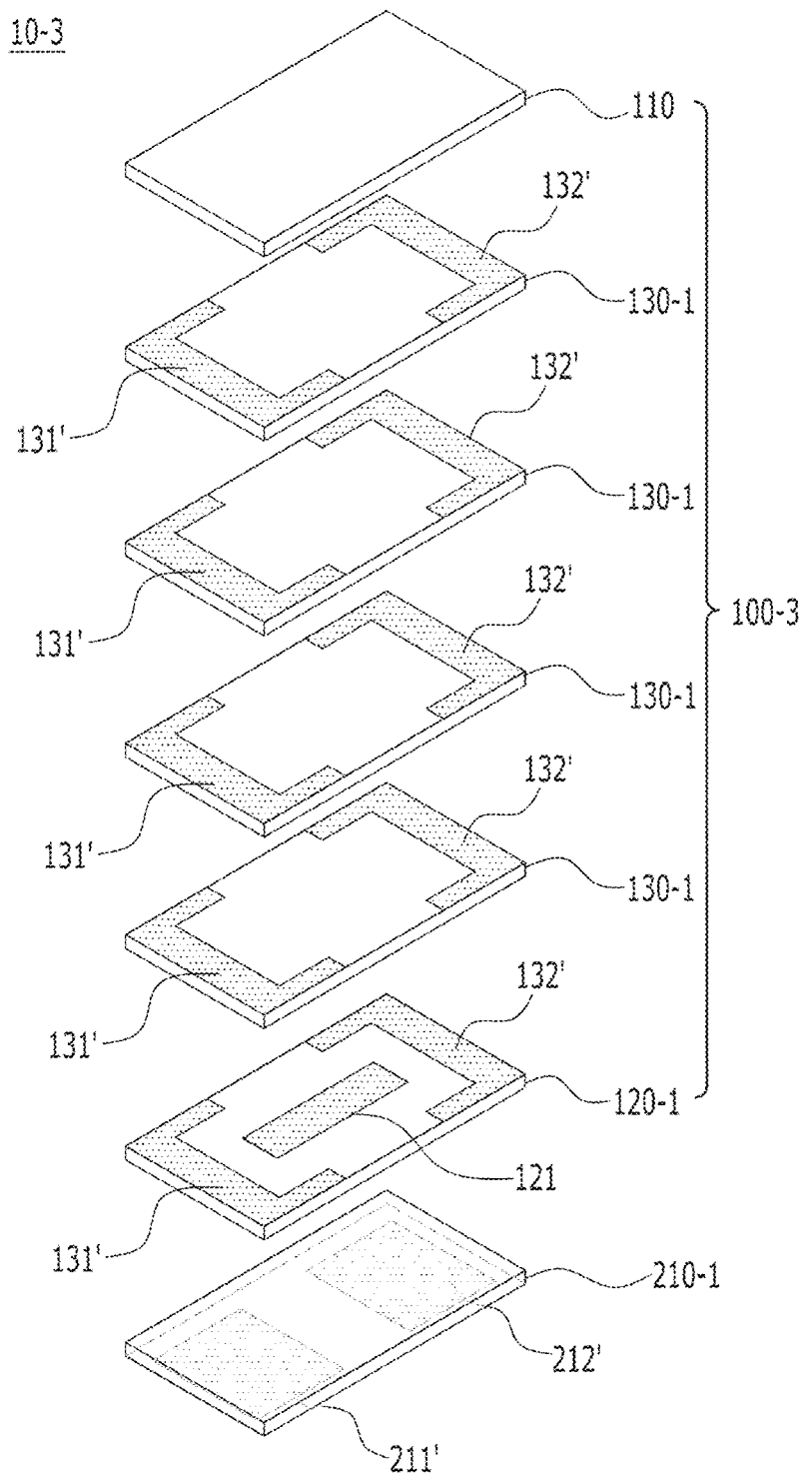

[FIG. 4B]
<u>10-3</u>
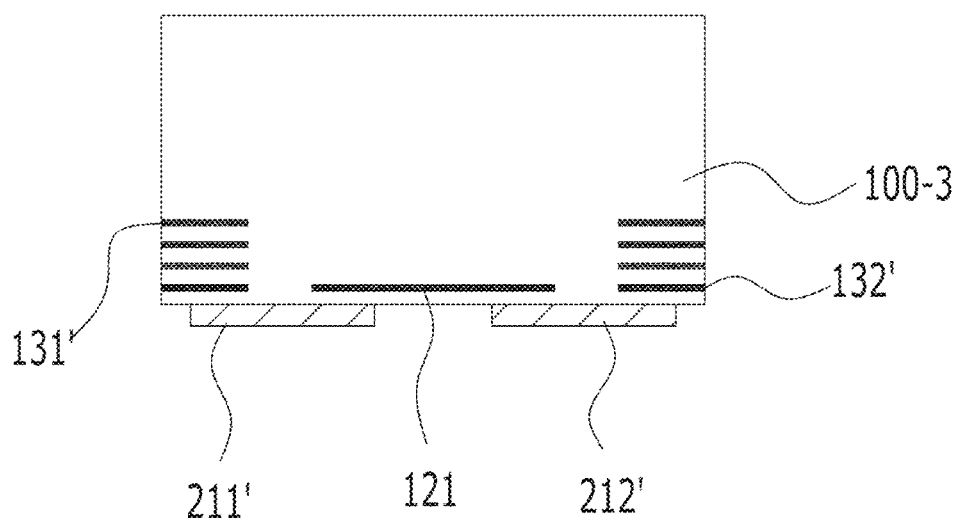

[FIG. 5A]
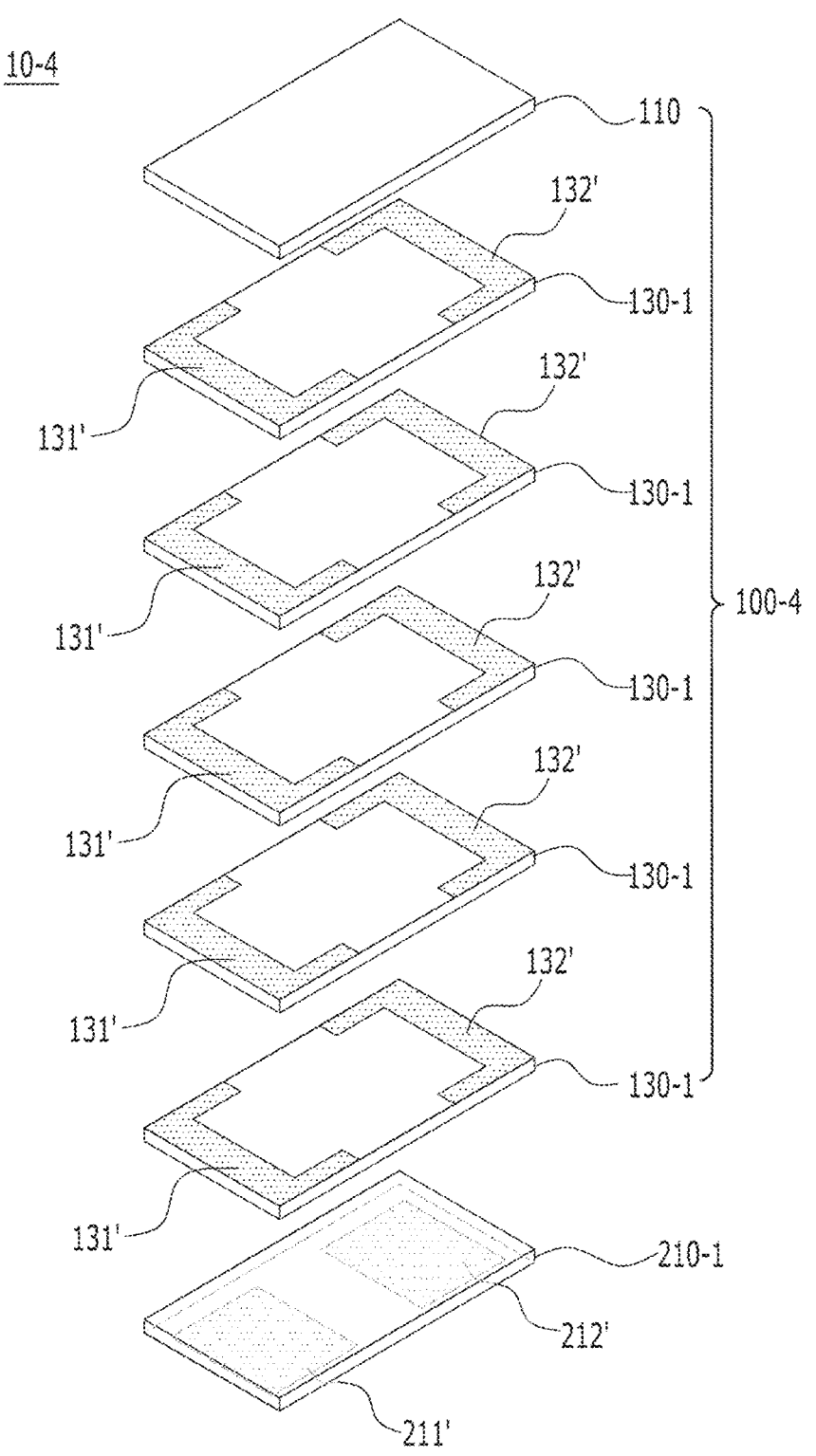

[FIG. 5B]
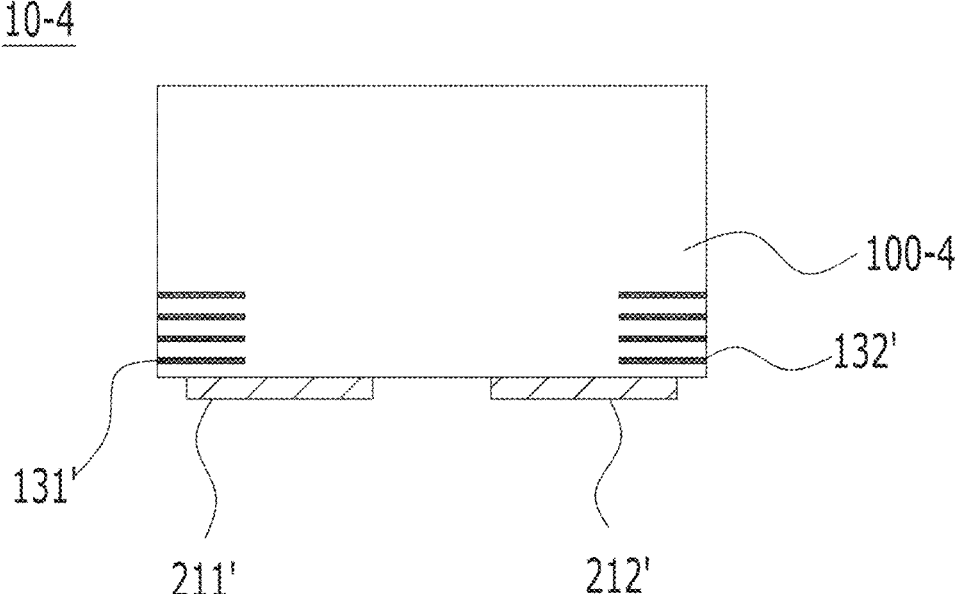

[FIG. 6A]
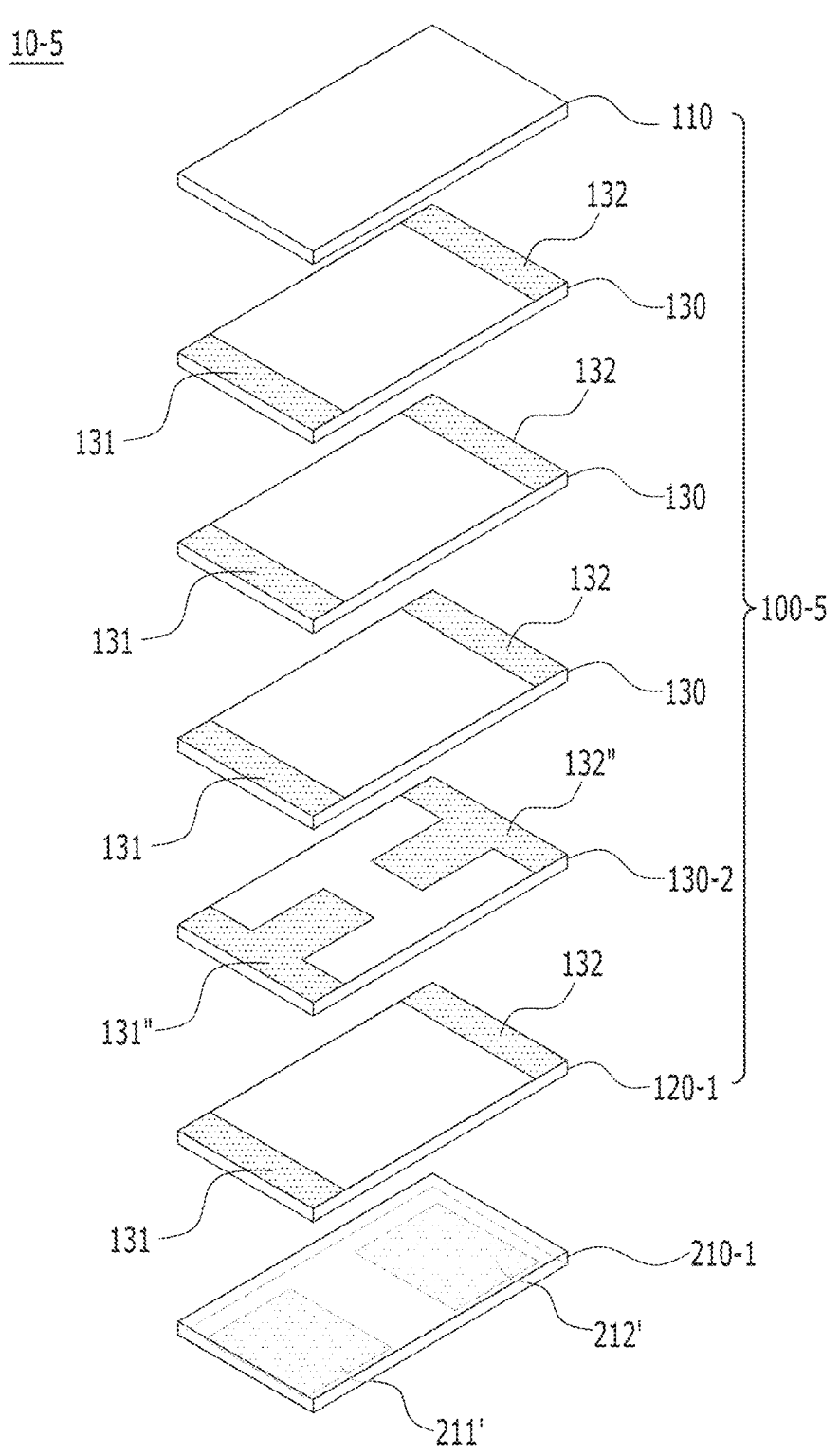

[FIG. 6B]
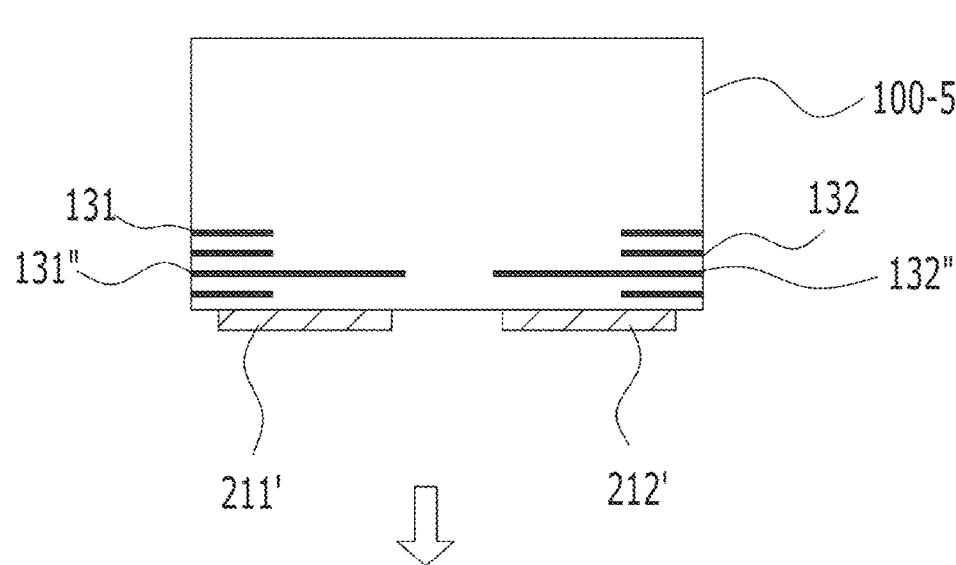
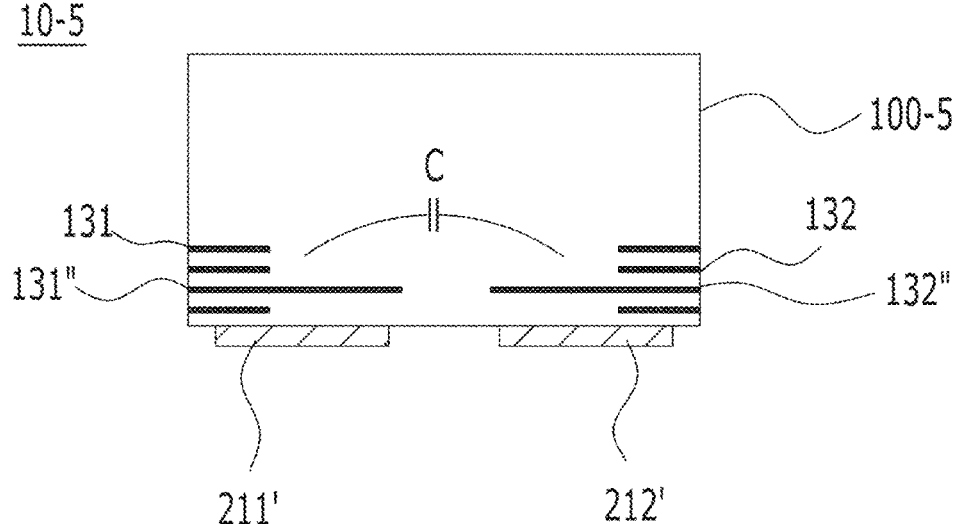

CERAMIC CAPACITOR

TECHNICAL FIELD

The present disclosure relates to a ceramic capacitor, and more particularly, to a multilayer ceramic capacitor that is applied to an electronic device.

BACKGROUND ART

A capacitor is used for the purpose of protecting a component in which a voltage should be kept constant by storing electricity therein and by uniformly and stably supplying the stored electricity to the component as much as the component needs, for the purpose of removing a noise in an electronic device, or for the purpose of passing only an AC signal from signals where DC and AC are mixed.

Recently, with the trend of miniaturization, light weight, digitalization, and high frequency of an electronic device, a multilayer ceramic capacitor (multilayer chip capacitor (MLCC)) in which a ceramic is stacked in several layers as a dielectric between electrodes has widely been used. The multilayer ceramic capacitor helps an electronic device, in which active elements and passive elements are distinguished from one another, to operate well by removing the noise that exerts an influence on the active elements, such as semiconductors and ICs. The noise means a signal that disturbs an operation of the electronic device.

A ceramic capacitor is composed of the dielectric, inner electrodes, and outer electrodes. In the ceramic capacitor, since electric charge is accumulated between the inner electrodes facing each other, miniaturization and high capacity are implemented through stacking of many layers of inner electrodes in a limited space. Regarding such a ceramic capacitor, a low-capacity ceramic capacitor having a small number of stacks of inner electrodes is more suitable than a high-capacity ceramic capacitor at a high frequency where a quick response is required.

However, since the low-capacity ceramic capacitor having a small number of stacks of inner electrodes has a weak tensile strength due to the small number of stacks of inner electrodes, cracks may easily occur as stress is concentrated at a soldering area during soldering for electrically connecting outer electrodes to a circuit board. If the cracks occur in the ceramic capacitor, the characteristics required in the ceramic capacitor are changed, and thus reliability is degraded.

The matters described in the above background technology are to help understanding of the background of the present disclosure, and may include the matters that are not the disclosed related art.

SUMMARY OF INVENTION

Technical Problem

An object of the present disclosure is to provide a multilayer ceramic capacitor having a low-capacity structure, which has a quick reaction speed as operating at a high frequency.

Another object of the present disclosure is to provide a high-frequency multilayer ceramic capacitor, which improves a tensile strength so as to prevent a crack occurrence during soldering of an outer electrode to a circuit board in a low-capacity structure.

Solution to Problem

In order to achieve the above object, a ceramic capacitor according to an embodiment of the present disclosure includes: a ceramic body in which a plurality of first dielectric layers are stacked; and first and second bottom electrodes disposed on both sides of a lower surface of the ceramic body.

The ceramic body further includes a second dielectric layer on which a float electrode is disposed, and the float electrode is spaced apart from both side surfaces of the second dielectric layer, and both ends of the float electrode overlap parts of the first and second bottom electrodes.

A dummy electrode is further disposed on the second dielectric layer, and the float electrode is disposed on a central part in a length direction of the second dielectric layer, and the dummy electrode is disposed to be spaced apart from the float electrode, and is exposed to both side surfaces of the ceramic body.

The ceramic body further includes a plurality of third dielectric layers on which a dummy electrode is disposed, and the dummy electrode is exposed to both side surfaces of the ceramic body.

The ceramic body includes a plurality of dummy electrodes disposed above the first and second bottom electrodes and exposed to both side surfaces of the ceramic body.

An interval between the first and second bottom electrodes and the dummy electrode located at a lowermost part or an interval between the dummy electrodes is an interval at which a solder is able to rise along the dummy electrode during soldering of the first and second bottom electrodes onto a substrate.

An interval in a height direction between the dummy electrodes is 2 μm to 3 μm.

The ceramic body further includes a second dielectric layer and a third dielectric layer, and the dummy electrodes are formed on both sides of at least one of upper surfaces and lower surfaces of the second dielectric layer and the third dielectric layer, are exposed to both side surfaces thereof, and are shaped to face each other.

The dummy electrode is formed in one of a straight shape, a "□" shape, and a "T" shape.

Dummy electrode parts exposed to the both side surfaces of the ceramic body and the first and second bottom electrodes are connected by plating.

One of the dummy electrodes is disposed on the same dielectric layer as that of a float electrode.

A distance between the dummy electrode located at an uppermost part among the dummy electrodes and the bottom electrode is equal to or less than a half of a height of the ceramic body.

Advantageous Effects of Invention

The present disclosure has the effects of manufacturing an ultralow-capacity ceramic capacitor in which a capacitance C is formed between a first bottom electrode and a second bottom electrode without inner electrodes, and being easily applied to an electronic device that requires a quick reaction speed in case of operating at a high frequency.

Further, since the present disclosure includes a float electrode therein, and the capacitance C can be additionally formed between the float electrode and the first and second bottom electrodes, it is possible to adjust the capacitance although the capacitor is manufactured with a low capacity.

Further, since the present disclosure includes a plurality of dummy electrodes being exposed to both side surfaces of the ceramic body, and improves tensile strength, the solder S rises along the dummy electrode during soldering of the bottom electrodes onto the substrate, so that the soldering area is increased, the crack occurrence is prevented, and the bottom electrodes can be stably mounted even on the substrate.

Further, the present disclosure forms the dummy electrode to have a shape that reinforces the tensile stress of both side parts of the lower end of the ceramic body while contributing to the forming of the capacitance, and thus during mounting of the ceramic capacitor on the substrate, stable joint of the ceramic capacitor by soldering is possible, the ceramic capacitor can be manufactured with a low capacitance, and if necessary, an additional capacitance can be secured.

As described above, since the ceramic capacitor of the present disclosure can be manufactured with a low capacitance to be suitable for high frequency use, and the capacitance can be adjusted within a predetermined range even without applying inner electrodes, the problem of insufficient tensile strength due to the absence of the inner electrodes can be solved by applying the dummy electrodes, and thus a high-reliable ceramic capacitor can be manufactured.

BRIEF DESCRIPTION OF DRAWINGS

FIG. 1A is a perspective view showing a ceramic capacitor according to a first embodiment of the present disclosure.

FIG. 1B is an exploded perspective view showing a ceramic capacitor according to a first embodiment of the present disclosure.

FIG. 1C is a longitudinal cross-sectional view of a ceramic capacitor according to a first embodiment of the present disclosure.

FIG. 2A is a perspective view showing a ceramic capacitor according to a second embodiment of the present disclosure.

FIG. 2B is an exploded perspective view showing a ceramic capacitor according to a second embodiment of the present disclosure.

FIG. 2C is a longitudinal cross-sectional view of a ceramic capacitor according to a second embodiment of the present disclosure.

FIG. 3A is a perspective view showing a ceramic capacitor according to a third embodiment of the present disclosure.

FIG. 3B is an exploded perspective view showing a ceramic capacitor according to a third embodiment of the present disclosure.

FIG. 3C is a longitudinal cross-sectional view of a ceramic capacitor according to a third embodiment of the present disclosure.

FIG. 3D is a longitudinal cross-sectional view showing a soldered shape of a ceramic capacitor to be mounted on a substrate according to a third embodiment of the present disclosure.

FIG. 3E is a longitudinal cross-sectional view showing a modified example of a soldered shape of a ceramic capacitor to be mounted on a substrate according to a third embodiment of the present disclosure.

FIG. 4A is an exploded perspective view showing a ceramic capacitor according to a fourth embodiment of the present disclosure.

FIG. 4B is a longitudinal cross-sectional view of a ceramic capacitor according to a fourth embodiment of the present disclosure.

FIG. 5A is an exploded perspective view showing a ceramic capacitor according to a fifth embodiment of the present disclosure.

FIG. 5B is a longitudinal cross-sectional view of a ceramic capacitor according to a fifth embodiment of the present disclosure.

FIG. 6A is an exploded perspective view showing a ceramic capacitor according to a sixth embodiment of the present disclosure.

FIG. 6B is a longitudinal cross-sectional view of a ceramic capacitor according to a sixth embodiment of the present disclosure.

DESCRIPTION OF EMBODIMENTS

Hereinafter, preferred embodiments of the present disclosure will be described in detail with reference to the accompanying drawings.

FIG. 1A is a perspective view showing a ceramic capacitor according to a first embodiment of the present disclosure, FIG. 1B is an exploded perspective view showing a ceramic capacitor according to a first embodiment of the present disclosure, and FIG. 1C is a longitudinal cross-sectional view of a ceramic capacitor according to a first embodiment of the present disclosure. The drawings are only for understanding of the subject matter of the present disclosure, and it should not be interpreted that the scope of the present disclosure is limited by the drawings. Further, in the drawings, relative thicknesses or lengths, or relative sizes may be exaggerated for convenience and clarity of explanation.

As illustrated in FIG. 1A, a ceramic capacitor 10 according to a first embodiment of the present disclosure includes a ceramic body 100 and first and second bottom electrodes 211 and 212. The ceramic body 100 is formed of only a dielectric. The first and second bottom electrodes 211 and 212 are disposed on both sides of a lower surface of the ceramic body 100. The ceramic body 100 is formed in a cuboidal shape, and the lower surface of the ceramic body 100 is referred to as a surface which is mounted on a substrate.

Since the ceramic body 100 is composed of only the dielectric, the ceramic capacitor 10 according to the first embodiment has a structure in which inner electrodes are not present. The ceramic capacitor 10 forms a capacitance between the first bottom electrode 211 and the second bottom electrode 212. The capacitance may be 0.1 pF to 5 pF. The capacitance formed between the first bottom electrode 211 and the second bottom electrode 212 may be adjusted by a gap distance between the first bottom electrode 211 and the second bottom electrode 212. Since a low capacitance is formed between the first bottom electrode 211 and the second bottom electrode 212, the ceramic capacitor is suitable to be used at a high frequency where a quick response is required. At a high frequency where a quick response is required, a low-capacitance capacitor is more suitable than a high-capacitance capacitor.

As illustrated in FIG. 1B, the ceramic capacitor 10 according to the first embodiment is in the form in which a first dielectric layer 110 composed of only a dielectric and a bottom electrode layer 210 on which the first and second bottom electrodes 211 and 212 are disposed are stacked.

The dielectric material that forms the first dielectric layer 110 may be a barium titanate (BaTiO3)-based ceramic having a high permittivity. In addition, the dielectric material that forms the first dielectric layer 110 may use or additionally include (Ca, Zr)(Sr, Ti)03. However, since the capacitance is in proportion to the permittivity of the dielectric, it is preferable to use the dielectric material BaTiO3 having a high permittivity. A plurality of first dielectric layers 110 may be stacked to form the ceramic body 100.

The first and second bottom electrode 211 and 212 are outer electrodes for being connected to the substrate. The first and second bottom electrodes 211 and 212 are disposed on both sides of a lower surface of the bottom electrode layer 210. The bottom electrode layer 210 may be formed by printing or applying a bottom electrode material on both sides of the lower surface of a ceramic sheet produced with a dielectric material.

As an example, the ceramic capacitor 10 of the first embodiment may be produced in a manner that the bottom electrode layer 210 is formed by printing or applying the bottom electrodes on both sides of the lower surface of the ceramic sheet that is manufactured with the dielectric material, the ceramic sheet produced with only the dielectric material is repeatedly stacked on the upper surface of the bottom electrode layer 210 and compressed to increase the density thereof, and the stacked ceramic sheet is cut and sintered in the form of a chip. Here, the ceramic sheet may be manufactured in a molding process in which slurry is made by uniformly mixing dielectric material powder and added ingredients, and then the slurry is uniformly coated on a film.

Further, the first and second bottom electrodes 211 and 212 may be formed in a manner that a ceramic sheet laminate is manufactured through repeated stacking of the ceramic sheet manufactured with only the dielectric material, and after compressing, sintering, and polishing of the ceramic sheet laminate, a bottom electrode material is printed or applied on the lower surface of the sintered laminate. In this case, the number of stacks of the ceramic sheet can be selectively adjusted depending on the thickness of the ceramic sheet.

Since the ceramic capacitor 10 of the first embodiment has a structure that does not include the inner electrodes, the ceramic sheet may be produced as one lump having a predetermined thickness instead of repeated stacking of the ceramic sheet, and thus the work time can be reduced.

As an example, although not illustrated, the ceramic capacitor 10 of the first embodiment may be produced by forming the bottom electrode layer 210 through printing or applying of the bottom electrodes on both sides of the lower surface of the ceramic sheet that is manufactured with the dielectric material, stacking the ceramic sheet of a predetermined shape produced with only the dielectric material on the upper surface of the bottom electrode layer 210, and then compressing, cutting, and sintering the stacked ceramic sheet.

Further, the ceramic capacitor 10 of the first embodiment may be produced in a manner that the ceramic sheet of a predetermined shape is manufactured with only the dielectric material, and after compressing, cutting, sintering, and polishing of the ceramic sheet, a bottom electrode material is printed or applied on the lower surface of the ceramic sheet.

As the bottom electrode material, Ag or Cu having high electrical conductivity may be used. A plating layer may be further formed on the first and second bottom electrodes 212 by plating Ni and Sn. By further forming the Ni and Sn plating layer on the first and second bottom electrode 212, adhesion to the substrate can be increased, and moisture resistance can be improved.

As illustrated in FIG. 1C, since the ceramic capacitor 10 according to the first embodiment has the structure in which the ceramic body 100 is made of only the dielectric and the inner electrodes are not present, it can be easily manufactured, and since the capacitance C is formed between the first bottom electrode 211 and the second bottom electrode

212, the ceramic capacitor 10 can be manufactured with an ultralow capacity. The capacitance may be 0.1 pF to 5 pF, and preferably, may be in the range of 0.1 pF to 1 pF.

FIG. 2A is a perspective view showing a ceramic capacitor according to a second embodiment of the present disclosure, FIG. 2B is an exploded perspective view showing a ceramic capacitor according to a second embodiment of the present disclosure, and FIG. 2C is a longitudinal cross-sectional view of a ceramic capacitor according to a second embodiment of the present disclosure.

As illustrated in FIG. 2A, a ceramic capacitor 10-1 according to a second embodiment of the present disclosure includes a ceramic body 100-1, a float electrode 121, and first and second bottom electrodes 211 and 212. The ceramic capacitor 10-1 according to the second embodiment includes the float electrode 121 in the ceramic body 100-1. Both ends of the float electrode 121 partially overlap the first and second bottom electrodes 211 and 212, and thus the capacitance is additionally formed. Since the float electrode 121 partially overlaps the first and second bottom electrodes 211 and 212, and the capacitance is additionally formed, the ceramic capacitor 10-1 according to the second embodiment can accumulate a relatively higher capacitance than that of the first embodiment.

The float electrode 121 is spaced apart from the first and second bottom electrodes 211 and 212, and both ends of the float electrode 121 overlap parts of the first and second bottom electrodes 211 and 212. The capacitance may be adjusted by adjusting a gap distance between the float electrode 121 and the first and second bottom electrodes 211 and 212 and an overlapping (facing) area between the both ends of the float electrode 121 and the first and second bottom electrodes 211 and 212. If the facing area between the both ends of the float electrode 121 and the first and second bottom electrodes 211 and 212 is large, a relatively large amount of charge can be accumulated. The capacitance of the ceramic capacitor 10-1 according to the second embodiment may be in the range of 0.1 pF to 5 pF, and in the above range, the ceramic capacitor 10-1 according to the second embodiment has a relatively higher capacitance than that of the ceramic capacitor 10 according to the first embodiment.

As illustrated in FIG. 2B, the ceramic capacitor 10-1 according to the second embodiment is in the form in which a first dielectric layer 110 composed of only a dielectric, a second dielectric layer 120 on which the float electrode 121 is disposed, and a bottom electrode layer 210 on which the first and second bottom electrodes 211 and 212 are disposed are stacked.

The ceramic body 100-1 may be formed through stacking of a plurality of first dielectric layers 110 and one or more second dielectric layers 120, and the bottom electrode layer 210 may be further stacked on the lower surface of the ceramic body 100-1 to form the ceramic capacitor 10-1.

The dielectric material that forms the first dielectric layer 110 may be a barium titanate (BaTiO3)-based ceramic having a high permittivity. In addition, the dielectric material that forms the first dielectric layer 110 may use or additionally include (Ca, Zr)(Sr, Ti)03.

The float electrode 121 is a constitution for additionally forming the capacitance. The float electrode 121 is disposed on a central part in a length direction of the second dielectric layer 120, and has a predetermined area so that parts of both ends of the float electrode 121 overlap the first and second bottom electrode 211 and 212. The float electrode 121 may be formed by printing or applying a float electrode material on an upper surface or a lower surface of the ceramic sheet produced with the dielectric material. The float electrode 121 is disposed inside the ceramic body 100-1, and is not exposed to outside.

The first and second bottom electrode 211 and 212 are outer electrodes for being connected to the substrate. The first and second bottom electrodes 211 and 212 are disposed on both sides of the lower surface of the bottom electrode layer 210. The bottom electrode layer 210 may be formed by printing or applying the bottom electrode material on both sides of the lower surface of the ceramic sheet produced with the dielectric material.

As an example, the ceramic capacitor 10-1 of the second embodiment may be produced in a manner that the bottom electrode layer 210 is formed by printing or applying the bottom electrodes on both sides of the lower surface of the ceramic sheet that is manufactured with the dielectric material, and the second dielectric layer 120 is formed by printing the float electrode on one of the upper surface and the lower surface of the ceramic sheet produced with the dielectric material, and then the second dielectric layer 120 is stacked on the upper surface of the bottom electrode layer 210, the plurality of first dielectric layers 110 are formed by repeatedly stacking the ceramic sheet produced with only the dielectric material on the upper surface of the second dielectric layer 120, and then a ceramic sheet laminate including the plurality of first dielectric layer 110 are cut and sintered in the form of a chip. Here, the ceramic sheet may be manufactured in a molding process in which slurry is made by uniformly mixing dielectric material powder (BaTiO3) and added ingredients, and then the slurry is uniformly coated on the film.

Further, the first and second bottom electrodes 211 and 212 may be formed in a manner that the second dielectric layer 120 on which the floating electrode is printed on the ceramic sheet is stacked on the upper surface of the ceramic sheet manufactured with only the dielectric material, a ceramic sheet laminate including the float electrode 121 is manufactured through repeated stacking of the ceramic sheet manufactured with only the dielectric material, and after compressing, sintering, and polishing of the ceramic sheet laminate including the float electrode 121, the bottom electrode material is printed or applied on the lower surface of the sintered laminate.

The capacitance can be adjusted by the gap distance between the float electrode 121 and the first and second bottom electrodes 211 and 212. In an embodiment, although it is described as an example that the second dielectric layer 120 is stacked on the upper surface of the bottom electrode layer 210, and the plurality of first dielectric layer 110 is stacked on the upper surface of the second dielectric layer 120, the gap distance between the float electrode 121 and the first and second bottom electrodes 211 and 212 can be adjusted by stacking the second dielectric layer 120 between the first dielectric layers 110.

As the float electrode material, one of Pd, Pt, Ag—Pd, and Ni or mixed metals thereof may be used, and Ag or Cu may be used to obtain high-Q in a high frequency band.

As the bottom electrode material, Ag or Cu having high electrical conductivity may be used. A plating layer may be further formed on the first and second bottom electrodes 212 by plating Ni and Sn. By further forming the Ni and Sn plating layer on the first and second bottom electrode 212, adhesion to the substrate can be increased, and moisture resistance can be improved.

As illustrated in FIG. 2C, the ceramic capacitor 10-1 according to the second embodiment can be manufactured with a low capacity since the float electrode 121 is included in the ceramic body 100-1, and both ends of the float electrode 121 are partially overlap the first bottom electrode 211 and the second bottom electrode 212 to form the capacitance C. The capacitance of the ceramic capacitor 10-1 according to the second embodiment may be 0.1 pF to 5 pF, and within the above range, the ceramic capacitor 10-1 can obtain higher capacitance than the capacitance according to the first embodiment.

FIG. 3A is a perspective view showing a ceramic capacitor according to a third embodiment of the present disclosure, FIG. 3B is an exploded perspective view showing a ceramic capacitor according to a third embodiment of the present disclosure, FIG. 3C is a longitudinal cross-sectional view of a ceramic capacitor according to a third embodiment of the present disclosure, FIG. 3D is a longitudinal cross-sectional view showing a soldered shape of a ceramic capacitor to be mounted on a substrate according to a third embodiment of the present disclosure, and FIG. 3E is a longitudinal cross-sectional view showing a modified example of a soldered shape of a ceramic capacitor to be mounted on a substrate according to a third embodiment of the present disclosure.

As illustrated in FIG. 3A, a ceramic capacitor 10-2 according to a third embodiment includes a ceramic body 100-2, a float electrode 121, dummy electrodes 131 and 132, and first and second bottom electrodes 211 and 212. The ceramic capacitor 10-2 according to the third embodiment includes the float electrode 121 and the dummy electrodes 131 and 132 on the ceramic body 100-2.

Both ends of the float electrode 121 partially overlap the first and second bottom electrodes 211 and 212, and thus an additional capacitance is formed. The float electrode 121 is spaced apart from the first and second bottom electrodes 211 and 212, and both ends of the float electrode 121 overlap parts of the first and second bottom electrodes 211 and 212. The capacitance may be adjusted by adjusting a gap distance between the float electrode 121 and the first and second bottom electrodes 211 and 212 and an overlapping (facing) area between the both ends of the float electrode 121 and the first and second bottom electrodes 211 and 212.

A plurality of dummy electrodes 131 and 132 are disposed above the first and second bottom electrodes 211 and 212, and are exposed to both side surfaces of the ceramic body 100-2. The dummy electrodes 131 and 132 are to secure the tensile strength of the ceramic capacitor 10-2. In case that the ceramic body 100 is made of only a dielectric material, or only one float electrode 121 is provided inside the ceramic body 100-1, the tensile strength may be decreased due to the characteristic of the ceramic material. Particularly, in case that the ceramic body 100 is made of only the dielectric material, stress may be concentrated on both sides of the lower part of the capacitor on which a load is concentrated during soldering joint of the ceramic capacitor with the substrate, and thus cracks may occur.

Accordingly, the tensile strength of a part that is joined with the substrate by soldering is reinforced by disposing the dummy electrodes 131 and 132 of plural layers on both sides of the ceramic body 100-2 that is adjacent to the bottom electrodes 211 and 212. If the dummy electrodes 131 and 132 of plural layers are disposed on both sides of the ceramic body 100-2 that is adjacent to the bottom electrodes 211 and 212, the tensile strength of the ceramic capacitor 10-2 having no inner electrode or having a small number of stacks of inner electrodes can be reinforced.

Further, the dummy electrodes 131 and 132 are exposed to both side surfaces of the ceramic body 100-2. The dummy electrodes 131 and 132 that are exposed to both side surfaces of the ceramic body 100-2 make a solder rise along the dummy electrodes 131 and 132 during soldering of the bottom electrodes 131 and 132 onto the substrate, so that the soldering area is increased, and the ceramic capacitor 10-2 is stably joined with the substrate with an area of an outer electrode being connected to the substrate increased, so that connection reliability is increased.

The plurality of dummy electrodes 131 and 132 are disposed above the first and second bottom electrodes 211 and 212. In the third embodiment, the plurality of dummy electrodes 131 and 132 are disposed up to a predetermined height above the first and second bottom electrodes 211 and 212, and thus serve to reinforce the tensile strength of the part that is joined with the substrate by soldering, but do not contribute to the forming of the capacitance.

As illustrated in FIG. 3B, the ceramic capacitor 10-2 according to the third embodiment is in the form in which the first dielectric layer 110 composed of only the dielectric, a third dielectric layer 130 on which the dummy electrodes 131 and 132 are disposed, a second dielectric layer 120 on which the float electrode 121 is disposed, and a bottom electrode layer 210 on which the first and second bottom electrodes 211 and 212 are disposed are stacked.

The dielectric material that forms the first dielectric layer 110 may be a barium titanate (BaTiO3)-based ceramic having a high permittivity. In addition, the dielectric material that forms the first dielectric layer 110 may use or additionally include (Ca, Zr)(Sr, Ti)03.

The float electrode 121 is disposed on a central part in a length direction of the second dielectric layer 120, and has a predetermined area so that both side surfaces of the float electrode 121 are spaced apart from both side surfaces in the length direction of the second dielectric layer 120, and parts of both ends of the float electrode 121 overlap the first and second bottom electrode 211 and 212. The float electrode 121 may be formed by printing or applying a float electrode material on an upper surface or a lower surface of the ceramic sheet produced with the dielectric material. The float electrode 121 is disposed inside the ceramic body 100-1, and is not exposed to outside.

One of the dummy electrodes 131 and 132 may be disposed on the same dielectric layer as that of the float electrode 121. As an example, one of the dummy electrodes 131 and 132 may be disposed on the second dielectric layer 120 on which the float electrode 121 is disposed, and the remainder may be disposed on the third dielectric layer 130 that is stacked on the upper surface of the second dielectric layer 120. A plurality of third dielectric layers 130 may be provided.

If one of the dummy electrodes 131 and 132 is disposed on the same dielectric layer as that of the float electrode 121, the number of stacks can be reduced, and thus the number of processes of manufacturing the ceramic capacitor 10-2 can be reduced.

On the second dielectric layer 120, the float electrode 121 may be disposed on a central part in a length direction of the second dielectric layer 120, and the dummy electrodes 131 and 132 may be disposed to be spaced apart from the float electrode 121, and may be exposed to both side surfaces of the ceramic body 100-2.

The dummy electrodes 131 and 132 disposed on the third dielectric layer 130 may be disposed on both sides of the upper surface of the third dielectric layer 130 so as to face each other and to be exposed to both ends of the ceramic body 100-2. In an embodiment, the dummy electrodes 131 and 132 disposed on the third dielectric layer 130 are formed on both sides of the upper surface of the third dielectric layer 130 so that straight shapes thereof are exposed to three surfaces.

The first and second bottom electrodes 211 and 212 are disposed on both sides of the lower surface of the bottom electrode layer 210. The bottom electrode layer 210 may be formed by printing or applying a bottom electrode material on both sides of the lower surface of the ceramic sheet produced with the dielectric material.

As an example, the ceramic capacitor 10-2 of the third embodiment is produced in a manner that the bottom electrode layer 210 is formed by printing or applying the bottom electrodes on both sides of the lower surface of the ceramic sheet that is manufactured with the dielectric material, and the second dielectric layer 120 is formed by printing the float electrode and the dummy electrodes 131 and 132 on one of the upper surface and the lower surface of the ceramic sheet produced with the dielectric material, and then the second dielectric layer 120 is stacked on the upper surface of the bottom electrode layer 210, and the third dielectric layer 130 is formed by printing the dummy electrodes 131 and 132 on the upper surface of the second dielectric layer 120 so as to be exposed to outside on both sides of one of the upper surface and the lower surface of the ceramic sheet manufactured with the dielectric material, and then the plurality of first dielectric layers 110 are formed by repeatedly stacking the ceramic sheet produced with only the dielectric material on the upper surface of the third dielectric layer 130, and a ceramic sheet laminate including the plurality of first dielectric layer 110 are cut and sintered in the form of a chip. Here, the ceramic sheet may be manufactured in a molding process in which slurry is made by uniformly mixing dielectric material powder (BaTiO3) and added ingredients, and then the slurry is uniformly coated on the film.

Further, the first and second bottom electrodes 211 and 212 may be formed in a manner that the second dielectric layer 120 on which the floating electrode 121 and the dummy electrodes 131 and 132 are printed on the ceramic sheet is stacked on the upper surface of the ceramic sheet manufactured with only the dielectric material, the plurality of third dielectric layers 130 on which the dummy electrodes 131 and 132 are printed are stacked on the upper surface of the second dielectric layer 120, a ceramic sheet laminate including the float electrode 121 and the dummy electrodes 131 and 132 is manufactured through repeated stacking of the ceramic sheet manufactured with only the dielectric material, and after compressing, sintering, and polishing of the ceramic sheet laminate, the bottom electrode material is printed or applied on the lower surface of the sintered laminate.

As the float electrode material, one of Pd, Pt, Ag—Pd, and Ni or mixed metals thereof may be used, and Ag or Cu may be used to obtain high-Q in a high frequency band.

As the material of the dummy electrodes 131 and 132, one of Pd, Pt, Ag—Pd, and Ni or mixed metals thereof may be used, and one of Au, Ag, and Cu or mixed metals thereof may be additionally plated. Further, as the material of the dummy electrodes 131 and 132, one of Au, Ag, and Cu or mixed metals thereof may be used.

As the bottom electrode material, Ag or Cu having high electrical conductivity may be used. A plating layer may be further formed on the first and second bottom electrodes 212 by plating Ni and Sn. By further forming the Ni and Sn plating layer on the first and second bottom electrode 212, adhesion to the substrate can be increased, and moisture resistance can be improved.

As illustrated in FIG. 3C, the ceramic capacitor 10-2 according to the third embodiment can be manufactured with a low capacity since the float electrode 121 and the dummy electrodes 131 and 132 are included in the ceramic body 100-2, and both ends of the float electrode 121 are partially overlap the first bottom electrode 211 and the second bottom electrode 212 to form the capacitance C, and the dummy electrodes 131 and 132 can reinforce the tensile strength of the both side parts of the lower end of the ceramic body 100-2 while not participating in the forming of the capacitance. The capacitance of the ceramic capacitor 10-2 according to the third embodiment may be 0.1 pF to 5 pF, and within the above range, the ceramic capacitor 10-2 can obtain higher capacitance than the capacitance according to the first embodiment.

It is preferable that a distance m between the dummy electrode located at an uppermost part among the dummy electrodes 131 and 132 and the bottom electrode is equal to or less than a half of a height n of the ceramic body 100-2. This is to form the dummy electrode only on a part that is adjacent to the bottom electrode since an area to which the solder is attached is high and thus only the part having a high crack occurrence probability is needed to be reinforced. The solder may be lead.

An interval between the first and second bottom electrodes and the dummy electrode located at a lowermost part or an interval between the dummy electrodes is an interval at which the solder is able to rise along the dummy electrode during soldering of the first and second bottom electrodes onto the substrate. Preferably, the interval between the dummy electrodes 131 and 132 is 2 μm to 3 μm.

As illustrated in FIG. 3D, since the ceramic capacitor 10-2 according to the third embodiment includes the dummy electrodes 131 and 132 being exposed to both side surfaces of the ceramic body 100-2, the solder S rises along the dummy electrodes 131 and 132 during soldering of the bottom electrodes 211 and 212 onto the substrate 20, so that the soldering area is increased, and the ceramic capacitor 10-2 is stably joined with the circuit pattern 21 of the substrate 20, and the area of the outer electrode that is connected to the substrate 20 is increased to improve connection reliability.

As illustrated in FIG. 3E, parts of the dummy electrodes 131 and 132 exposed to both side surfaces of the ceramic body 100-2 and the first and second bottom electrodes 211 and 212 may be connected with each other by plating.

That is, if a plating layer D that connects the parts of the dummy electrodes 131 and 132 exposed to both side surfaces of the ceramic body 100-2 and the first and second bottom electrodes 211 and 212 with each other is formed on the ceramic body 100-2 finally manufactured through cutting and sintering, the soldering can be performed more stably as the solder S rises along the plating layer D during the soldering.

The plating layer D may be made of one of Au, Ag, and Cu or mixed metals thereof.

FIG. 4A is an exploded perspective view showing a ceramic capacitor according to a fourth embodiment of the present disclosure, and FIG. 4B is a longitudinal cross-sectional view of a ceramic capacitor according to a fourth embodiment of the present disclosure.

As illustrated in FIG. 4A, a ceramic capacitor 10-3 according to a fourth embodiment is in the form in which the first dielectric layer 110 composed of only the dielectric, a third dielectric layer 130-1 on which the dummy electrodes 131' and 132' are disposed, a second dielectric layer 120-1 on which the float electrode 121 and the dummy electrodes 131' and 132' are all disposed, and a bottom electrode layer 210-1 on which the first and second bottom electrodes 211' and 212' are disposed are stacked.

In the fourth embodiment, the shape of the dummy electrodes 131' and 132' and the shape of the bottom electrodes 211' and 212' are different from those in the third embodiment, and thus only the different constitution will be described.

The dummy electrodes 131' and 132' disposed on the second dielectric layer 120-1 and the third dielectric layer 130-1 are disposed on both sides of the upper surfaces of the second dielectric layer 120-1 and the third dielectric layer 130-1, face each other, and are exposed to three surfaces, respectively. The dummy electrodes 131' and 132' can form the capacitance as "="-shaped facing front and rear ends thereof get close to each other. That is, the capacitance can be adjusted through adjustment of a distance between the "E"-shaped facing front and rear ends of the dummy electrodes 131' and 132'.

The bottom electrodes 211' and 212' may be in the shape in which the bottom electrodes 211' and 212' are disposed on both sides of the lower surface of the bottom electrode layer 210-1 with both ends thereof not exposed to the end parts. In case that the bottom electrodes 211' and 212' are in the shape in which the bottom electrodes 211' and 212' are disposed on both sides of the lower surface of the bottom electrode layer 210-1 with both ends thereof not exposed to the end parts, the cross-sectional area to which the solder S is attached is increased, and thus the bottom electrode 211' and 212' can be joined with the substrate 20 more stably. The bottom electrodes 211' and 212' are suitable for high frequency use.

As illustrated in FIG. 4B, the ceramic capacitor 10-3 according to the fourth embodiment can be manufactured with a low capacity since the float electrode 121 and the dummy electrodes 131' and 132' are included in the ceramic body 100-3, and both ends of the float electrode 121 are partially overlap the first bottom electrode 211' and the second bottom electrode 212' to form the capacitance C, and the dummy electrodes 131' and 132' can reinforce the tensile strength of the both side parts of the lower end of the ceramic body 100-3 while contributing to the forming of the capacitance as needed. The capacitance of the ceramic capacitor 10-3 according to the fourth embodiment may be 0.1 pF to 5 pF, and within the above range, the ceramic capacitor 10-3 can obtain higher capacitance than the capacitance according to the first embodiment.

FIG. 5A is an exploded perspective view showing a ceramic capacitor according to a fifth embodiment of the present disclosure, and FIG. 5B is a longitudinal cross-sectional view of a ceramic capacitor according to a fifth embodiment of the present disclosure.

As illustrated in FIG. 5A, a ceramic capacitor 10-4 according to a fifth embodiment is in the form in which the first dielectric layer 110 composed of only the dielectric, a third dielectric layer 130-1 on which the dummy electrodes 131' and 132' are disposed, and a bottom electrode layer 210-1 on which the first and second bottom electrodes 211' and 212' are disposed are stacked. A plurality of first dielectric layers 110 may be provided.

The fifth embodiment is different from the four embodiment on the point that only the "⊏"-shaped dummy electrodes 131' and 132' are applied without the float electrode, and thus only the different constitution will be described.

The dummy electrodes 131' and 132' disposed on the third dielectric layer 130-1 are disposed on both sides of the upper surfaces of the third dielectric layer 130-1, face each other, and are exposed to the both ends. In the fifth embodiment, the dummy electrodes 131' and 132' disposed on the third dielectric layer 130-1 are in the "⊏" shape, and are disposed on both sides of the upper surfaces of the third dielectric layer 130-1, and are exposed to three surfaces, respectively. The dummy electrodes 131' and 132' can form the capacitance as the "⊏"-shaped facing front and rear ends thereof get close to each other.

A plurality of third dielectric layers 130-1 on which the dummy electrodes 131' and 132' are disposed may be provided, and it is preferable that the interval between the dummy electrodes 131' and 132' is 2 µm to 3 µm so that the solder is able to rise along the dummy electrodes 131' and 132' during soldering of the first and second bottom electrodes 211' and 212' onto the substrate to form an outer electrode.

As illustrated in FIG. 5B, in the ceramic capacitor 10-4 according to the fifth embodiment, the dummy electrodes 131' and 132' are included in the ceramic body 100-4, and can reinforce the tensile strength of the both side parts of the lower end of the ceramic body 100-4 while contributing to the forming of the capacitance as needed. The capacitance of the ceramic capacitor 10-4 according to the fifth embodiment may be 0.1 pF to 5 pF, and within the above range, the ceramic capacitor 10-4 can obtain higher capacitance than the capacitance according to the first embodiment.

FIG. 6A is an exploded perspective view showing a ceramic capacitor according to a sixth embodiment of the present disclosure, and FIG. 6B is a longitudinal cross-sectional view of a ceramic capacitor according to a sixth embodiment of the present disclosure.

As illustrated in FIG. 6A, a ceramic capacitor 10-5 according to a sixth embodiment is in the form in which the first dielectric layer 110 composed of only the dielectric, a third dielectric layer 130 on which the dummy electrodes 131 and 132 are disposed, a fourth dielectric layer 130-2 on which dummy electrodes 131" and 132" having a shape different from the shape of the dummy electrodes 131 and 132 formed on the third dielectric layer 130 are disposed, and a bottom electrode layer 210-1 on which the first and second bottom electrodes 211' and 212' are disposed are stacked. A plurality of first dielectric layers 110 may be provided.

The sixth embodiment is different from the fifth embodiment on the point that the straight-shaped dummy electrodes 131 and 132 and the "T"-shaped dummy electrodes 131" and 132" are used interchangeably without the float electrode, and thus only the different constitution will be described.

The straight-shaped dummy electrodes 131 and 132 disposed on the third dielectric layer 130 are disposed on both sides of the upper surfaces of the third dielectric layer 130, face each other, and are exposed to the both ends. The dummy electrodes 131" and 132" disposed on the fourth dielectric layer 130-2 are in the "T" shape, and are disposed on both sides of the upper surface thereof, and are exposed to three surfaces, respectively. The dummy electrodes 131" and 132" can form the capacitance as the "T"-shaped facing middle parts thereof get close to each other.

A plurality of third dielectric layers 130 on which the dummy electrodes 131 and 132 are disposed may be provided, and one fourth dielectric layer 130-2 on which the dummy electrodes 131" and 132" having the different shape from the shape of the dummy electrode 131 and 132 formed on the third dielectric layer 130 may be provided. By adjusting the stacking order of the fourth dielectric layer 130-2 and the third dielectric layers 130, it is possible to adjust the gap distance between the "T"-shaped dummy electrodes 131 and 132 and the first and second bottom electrodes 211' and 212'.

It is preferable that the interval between the dummy electrodes 131, 132, 131", and 132" is 2 µm to 3 µm so that the solder is able to rise along the dummy electrodes during soldering of the first and second bottom electrodes 211' and 212' onto the substrate to form outer electrodes.

As illustrated in FIG. 6B, in the ceramic capacitor 10-5 according to the sixth embodiment, all of the dummy electrodes 131 and 132 for reinforcing the tensile strength and the dummy electrodes 131" and 132" for the tensile strength reinforcement and additional forming of the capacitance are included in the ceramic body 100-5, and can reinforce the tensile strength of the both side parts of the lower end of the ceramic body 100-5 while contributing to the forming of the capacitance C as needed. The capacitance of the ceramic capacitor 10-5 according to the sixth embodiment may be 0.1 pF to 5 pF, and within the above range, the ceramic capacitor 10-5 can obtain higher capacitance than the capacitance according to the first embodiment.

As described above, in the first embodiment of the present disclosure, the capacitance C is formed between the first bottom electrode 211 and the second bottom electrode 212, and thus it is possible to manufacture the ceramic capacitor with an ultralow capacity.

In the second embodiment, the float electrode 121 is included, and since the capacitance C is formed in a manner that the float electrode 121 partially overlaps the first bottom electrode 211 and the second bottom electrode 212, it is possible to manufacture the ceramic capacitor with a low capacity.

In the third embodiment, the dummy electrodes 131 and 132 that are exposed to both side surfaces of the ceramic body 100-2 are further included, and the solder S rises along the dummy electrodes 131 and 132 during soldering of the bottom electrodes 211 and 212 onto the substrate 20, so that the soldering area is increased, and the ceramic capacitor 10-2 can be stably joined with the circuit pattern 21 of the substrate 20.

In the fourth embodiment, since the dummy electrodes 131' and 132' are in the shape in which the dummy electrodes reinforce the tensile strength of both side parts of the lower end of the ceramic body 100-2 while contributing to the forming of the capacitance, stable joint is possible during mounting of the ceramic capacitor 10-3 on the substrate, the ceramic capacitor can be produced with a low capacity, and can obtain higher capacitance than the capacitance according to the second embodiment.

In the fifth embodiment, since the float electrode is not included, but only the dummy electrodes 131' and 132' are included in the ceramic body 100-4, the tensile strength is increased as compared with the first embodiment, and thus stable joint is possible during mounting of the ceramic capacitor 10-4 onto the substrate.

In the sixth embodiment, since the float electrode is not included, but only the dummy electrodes 131, 132, 131", and 132" are included in the ceramic body 100-4, and at least the dummy electrodes 131" and 132" among the dummy electrodes 131, 132, 131", and 132" are produced in the shape in which the dummy electrodes 131" and 132" can contribute to the forming of the capacitance, an additional capacity can be secured even without using the float electrode.

Among the above-described embodiments of the present disclosure, in the structure including the dummy electrodes, the inner electrode is not present or is minimized, and thus fracture or crack can be prevented from occurring during mounting of the substrate in the low-capacity ceramic capacitor having insufficient strength.

The above-described embodiments can be easily applied to the high-frequency and low-capacity ceramic capacitor, and although the first to sixth embodiments are separately carried out, they can be applied interchangeably.

The above explanation of the present disclosure is merely for exemplary explanation of the technical idea of the present disclosure, and it can be understood by those of ordinary skill in the art to which the present disclosure pertains that various corrections and modifications thereof will be possible in a range that does not deviate from the essential characteristics of the present disclosure. Accordingly, it should be understood that the embodiments disclosed in the present disclosure are not to limit the technical idea of the present disclosure, but to explain the same, and thus the scope of the technical idea of the present disclosure is not limited by such embodiments. The scope of the present disclosure should be interpreted by the appended claims to be described later, and all technical ideas in the equivalent range should be interpreted as being included in the scope of the present disclosure.

The invention claimed is:

1. A ceramic capacitor assembly comprising:
a substrate having a circuit pattern; and
a ceramic capacitor mounted on the substrate,
the ceramic capacitor comprising:
a ceramic body in which a plurality of first dielectric layers are stacked; and
first and second bottom electrodes disposed on both sides of a lower surface of the ceramic body,
wherein the ceramic body further comprises a second dielectric layer on which a float electrode is disposed,
wherein the float electrode is disposed on a central part in a length direction of the second dielectric layer, is spaced apart from both side surfaces of the second dielectric layer, and both ends of the float electrode overlap parts of the first and second bottom electrodes,
wherein the float electrode forms a capacitance with each of the first and second bottom electrodes, wherein the ceramic body comprises a plurality of dummy electrodes disposed on and above the second dielectric layer and exposed to both side surfaces of the ceramic body,
wherein an interval between the first and second bottom electrodes and the dummy electrode located at a lowermost part or an interval between the dummy electrodes is an interval at which a solder is able to rise along the dummy electrode during soldering of the first and second bottom electrodes onto the substrate, and
wherein the solder is disposed in contact with the dummy electrodes exposed to the both side surfaces of the ceramic body and the circuit pattern of the substrate, and rises along the dummy electrodes.

2. The ceramic capacitor assembly of claim 1, wherein the ceramic body further comprises a plurality of third dielectric layers on which the dummy electrodes are disposed, and
wherein the dummy electrodes are exposed to both side surfaces of the ceramic body.

3. The ceramic capacitor assembly of claim 1, wherein an interval in a height direction between the dummy electrodes is 2 μm to 3 μm.

4. The ceramic capacitor assembly of claim 1, wherein the ceramic body further comprises a third dielectric layer, and
wherein the dummy electrodes are formed on both sides of at least one of upper surfaces and lower surfaces of the second dielectric layer and the third dielectric layer, are exposed to both side surfaces thereof, and are shaped to face each other.

5. The ceramic capacitor assembly of claim 1, wherein the dummy electrode is formed in one of a straight shape, a "⊏" shape, and a "T" shape.

6. The ceramic capacitor assembly of claim 1, wherein the dummy electrodes parts exposed to the both side surfaces of the ceramic body and the first and second bottom electrodes are connected by plating.

7. The ceramic capacitor assembly of claim 1, wherein a distance between the dummy electrode located at an uppermost part among the dummy electrodes and the bottom electrode is equal to or less than a half of a height of the ceramic body.

* * * * *